(12) United States Patent
Delaporte

(10) Patent No.: US 12,216,507 B2
(45) Date of Patent: Feb. 4, 2025

(54) TRANSVERSE COMPRESSION CAM FOR A FLEXIBLE DISPLAY DEVICE

(71) Applicant: Lepton Computing LLC, Brooklyn, NY (US)

(72) Inventor: Stephen E. Delaporte, New York, NY (US)

(73) Assignee: LEPTON COMPUTING LLC, Brooklyn, NY (US)

( * ) Notice: Subject to any disclaimer, the term of this patent is extended or adjusted under 35 U.S.C. 154(b) by 0 days.

(21) Appl. No.: 17/567,124

(22) Filed: Jan. 1, 2022

(65) Prior Publication Data
US 2022/0187877 A1      Jun. 16, 2022

Related U.S. Application Data

(60) Provisional application No. 63/122,602, filed on Dec. 8, 2020.

(51) Int. Cl.
G06F 1/16      (2006.01)
G06F 3/041     (2006.01)

(52) U.S. Cl.
CPC .......... *G06F 1/1681* (2013.01); *G06F 1/1616* (2013.01); *G06F 1/1652* (2013.01); *G06F 3/0412* (2013.01)

(58) Field of Classification Search
CPC .... G06F 1/1681; G06F 1/1616; G06F 1/1652; G06F 3/0412; G06F 2203/04102; G06F 3/041
See application file for complete search history.

(56) References Cited

U.S. PATENT DOCUMENTS

| 4,436,439 A | 3/1984 | Koto | |
| 6,900,981 B2* | 5/2005 | Kuivas | G06F 1/1618 248/920 |
| 7,155,266 B2* | 12/2006 | Stefansen | H04M 1/022 455/90.3 |
| 7,426,406 B2* | 9/2008 | Maatta | G06F 1/1681 455/575.8 |
| 7,512,426 B2* | 3/2009 | Maatta | H04N 1/00535 455/575.1 |
| 7,667,959 B2* | 2/2010 | Pelkonen | G06F 1/1616 248/923 |

(Continued)

*Primary Examiner* — Anthony M Haughton
*Assistant Examiner* — Theron S Milliser
(74) *Attorney, Agent, or Firm* — ArentFox Schiff LLP; Joseph M. Maraia

(57) ABSTRACT

A foldable touch screen display device made up of flexible segments that can be folded from a compact state to an expanded state which also includes a transverse compression cam mechanism is described. The form factor of the compact state is roughly the size of a typical handheld phone or smaller. The form factor of the expanded state is roughly the size of a larger phone or tablet computer, which may also have the size and mechanical functionality of a laptop. The device form factor may also be a flip phone configuration. Both folded states may include an integrated speaker and microphone. The transverse compression cam mechanism is utilized to stabilize the folded angle of the device's display segments as they are folded along their hinge and to lock the device in an unfolded or folded state. The device may further include sensors to indicate the position of each display segment.

12 Claims, 4 Drawing Sheets

(56) References Cited

U.S. PATENT DOCUMENTS

| | | | | |
|---|---|---|---|---|
| 8,385,991 B2* | 2/2013 | Wang | G06F 1/1681 | 455/90.3 |
| 8,782,853 B2* | 7/2014 | Ge | G06F 1/1681 | 248/292.12 |
| 8,854,834 B2* | 10/2014 | O'Connor | G06F 1/1641 | 16/334 |
| 8,959,716 B2* | 2/2015 | Hsu | G06F 1/1681 | 16/302 |
| 8,971,031 B2* | 3/2015 | Mok | H04M 1/0268 | 361/679.27 |
| 9,665,126 B2* | 5/2017 | O'Connor | H04M 1/022 | |
| 9,696,763 B2* | 7/2017 | Mok | G06F 1/1656 | |
| 9,760,126 B2* | 9/2017 | Shin | G06F 1/1616 | |
| 10,154,124 B2* | 12/2018 | Mok | G06F 1/1656 | |
| 10,474,203 B2* | 11/2019 | Tazbaz | G06F 1/1616 | |
| 10,659,584 B2* | 5/2020 | Mok | G06F 1/1679 | |
| 11,122,155 B2* | 9/2021 | Mok | G06F 1/1681 | |
| 11,382,228 B2* | 7/2022 | Chen | H05K 5/0226 | |
| 2004/0212956 A1* | 10/2004 | Kuivas | G06F 1/1681 | 361/679.06 |
| 2005/0239520 A1* | 10/2005 | Stefansen | H04M 1/022 | 455/575.1 |
| 2006/0236505 A1* | 10/2006 | Maatta | G06F 1/1681 | 16/366 |
| 2006/0238968 A1* | 10/2006 | Maatta | H04N 1/00525 | 361/679.01 |
| 2007/0151381 A1* | 7/2007 | Pelkonen | G06F 1/1679 | 74/437 |
| 2007/0164924 A1* | 7/2007 | Anderson | H04M 1/022 | 345/1.1 |
| 2012/0120627 A1* | 5/2012 | O'Connor | H04M 1/022 | 16/374 |
| 2013/0016492 A1* | 1/2013 | Wang | E05D 3/18 | 16/303 |
| 2013/0219661 A1* | 8/2013 | Ge | E05D 3/06 | 16/367 |
| 2014/0042293 A1* | 2/2014 | Mok | G06F 1/1656 | 248/682 |
| 2014/0290008 A1* | 10/2014 | Hsu | E05D 3/06 | 16/386 |
| 2014/0373338 A1* | 12/2014 | O'Connor | G06F 1/1681 | 29/592.1 |
| 2015/0153787 A1* | 6/2015 | Mok | G06F 1/1652 | 361/679.27 |
| 2016/0070306 A1* | 3/2016 | Shin | H04M 1/0268 | 361/679.27 |
| 2017/0264723 A1* | 9/2017 | Mok | H04M 1/0268 | |
| 2018/0059735 A1* | 3/2018 | Tazbaz | G06F 1/1677 | |
| 2019/0075196 A1* | 3/2019 | Mok | G06F 1/1656 | |
| 2020/0033917 A1* | 1/2020 | Tazbaz | G06F 1/1616 | |
| 2020/0280624 A1* | 9/2020 | Mok | G06F 1/1681 | |
| 2021/0337687 A1* | 10/2021 | Chen | H05K 5/0226 | |
| 2021/0368035 A1* | 11/2021 | Mok | G06F 1/1656 | |
| 2022/0011828 A1* | 1/2022 | Zhan | G06F 1/1616 | |

* cited by examiner

TRANSVERSE COMPRESSION CAM FOR A FLEXIBLE DISPLAY DEVICE

CROSS REFERENCE TO RELATED APPLICATIONS

This application claims the benefit of U.S. Provisional Patent Application No. 63/133,239, filed on Jan. 1, 2021, which is incorporated in its entirety herein by reference.

FIELD OF THE INVENTION

The present invention relates generally to computing devices, and more particularly, to a computing device with a touch screen display that can be folded from a compact state to an expanded state.

BACKGROUND OF THE INVENTION

The use of handheld computing devices today has been significantly enabled by a number of advancements in electronics, including the miniaturization of components, an increase in processing speeds, improved memory capacity, and the optimization of battery efficiency. Advancements in touch screen display technology have also enabled interfaces to become more adaptable and intuitive to use on a small scale. Because of these enormous improvements over the last decade, the differences in the performance between handheld computing devices, such as mobile phones, and larger computing devices, have become increasingly subtle.

One of the great difficulties in using a small-scale touch screen device, however, is in the fact that it can often be cumbersome to physically interact with. This is especially apparent when selecting and manipulating features and inputting text, which can sometimes be imprecise for a user. In such handheld computing devices as a touch screen mobile phone, the limited size of the display can also significantly reduce the viewing capacity while watching videos, using graphic intensive applications, and reading text. The rigid nature of a standard touch screen display can also limit the portability of a device when its form factor is in the larger size range for a phone, or at the scale of a tablet, which makes folding a desirable feature. Additionally, because a foldable device fundamentally has a hinge mechanism to facilitate folding, a mechanism for stabilizing the folded angle at any angle including at the fully unfolded or folded state would be advantageous.

There is therefore a need for touch screen display devices that can be adjusted in size without sacrificing the convenience of being compact or handheld. There is also a need for a cam mechanism to stabilize the folded angle of the device's display segments as they are folded along their hinge and to lock the device in an unfolded or folded state through the utilization of a compression spring to force a pin against a cam. Having the ability to stabilize the angle of a foldable device using a transverse compression cam is also desirable to optimize viewing by the user along with other applications where a fixed angle of the display segments relative to each other is desired.

SUMMARY OF EMBODIMENTS OF THE INVENTION

A foldable touch screen display device made up of flexible segments that can be folded from a compact state to an expanded state which also includes a transverse compression cam mechanism. The form factor of the compact state is roughly the size of a typical handheld phone or smaller. The form factor of the expanded state is roughly the size of a larger phone or tablet computer, which may also have the size and mechanical functionality of a laptop. The device form factor may also be a flip phone configuration. Both folded states may include an integrated speaker and microphone. The transverse compression cam mechanism is utilized to stabilize the folded angle of the device's display segments as they are folded along their hinge and to lock the device in an unfolded or folded state. The device may further include sensors to indicate the position of each display segment. In one embodiment, a module attached to, situated within, or otherwise associated with at least one segment of the flexible display or rigid display may contain all or substantially all processing and memory, along with a communications system, which may be used in any folded state.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Figure 1:
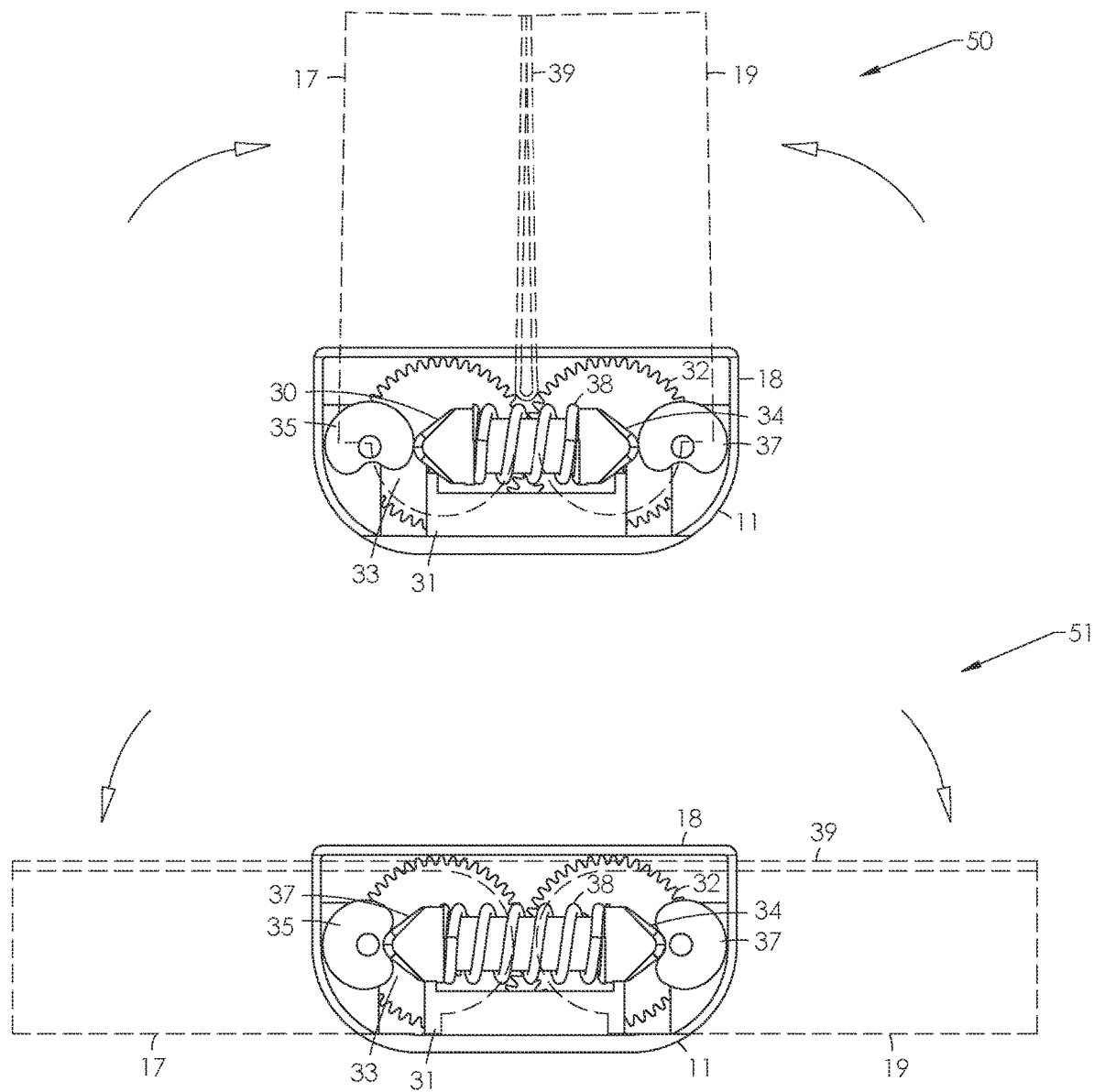
FIG. 1 is a side view of the hinge section for a foldable computing device shown in two separate positions, the first position shows the two display segments being closed about the hinge to a folded state with pins providing continuous compression against cams, while the second position shows the two display segments being opened about the hinge to an expanded state with the pins engaging with each of the cam's respective grooves to provide a locked state.

In accordance with the exemplary embodiment shown in FIG. 1, a foldable computing device 11 having two display segments 17 and 19 that fold along hinge 18, are shown in two separate positions 50 and 51. The first position 50 shows the two display segments 17 and 19 being closed about hinge 18 to a folded state with spur gear 33 and cam 35 connected to segment 17, which is also synched to an adjacent spur gear 32 and cam 37 that are connected to the opposite display segment 19. The cam mechanism plays an important role in stabilizing the folding angle of the device in that spring 38, which sits on a pin holding structure 31 creates compression on pins 30 and 34 to force them against cams 35 and 37 allowing the device to be held at any desired folded angle. The second position 51 from FIG. 1 shows the two display segments 17 and 19 being opened about hinge 18 to an expanded state with cams 35 and 37 rotated to a new position, which is driven by the rotation of segments 17 and 19 and their respective spur gears 32 and 33 such that their grooves provide a place for pins 37 and 34 to engage with them. This ultimately allows the device to be locked in the unfolded state. This same transversely located compression cam could be used to also lock the device in the folded state if a second groove were added to cams 35 and 37 so that it would correspond with the angle of the folded state. A second set of cams and pins could also be used to lock the device in the folded state.

One of the advantages to having a transverse compression pin is that is utilizes a single spring to provide compression against the two cams connected to each flexible display segment and their respective structures, thus reducing the number of components needed in the assembly which would typically require two separate springs. This is highlighted further in the perspective view from FIG. 2. where spur gears 33 and 32 are shown at one end of the assembly where they are mechanically attached to their respective display segment structures. As synched gears 33 and 32 rotate in opposite directions to each other, they in turn rotate their attached gears 55 and 57, where 33 and 55 represent one compound gear while 32 and 57 represent a second compound gear. As gears 55 and 57 each rotate, they in turn rotate spur gears 58 and 59 which are each connected to separate cams that also rotate in opposite directions to each other. Similar to what is shown in FIG. 1, cam 35 in FIG. 2, which is attached to spur gear 55, engages with pin 30 and as cam 35 rotates to where the device is in an open state, the groove of cam 35 locks with pin 30 from the compression applied to it from spring 38. This locked configuration is shown in position 53 at the top of FIG. 2 which corresponds with position 51 from FIG. 1. Compression spring 38 which sits on pin holding structure 31 simultaneously applies a force against pin 34 which in turn is forced against rotating cam 37 and locks with its groove at the same time that pin 30 locks with the groove of cam 35. In position 56 from FIG. 2, which corresponds with position 50 from FIG. 1, pin 30 and 34 are shown in an unlocked position where they are being compressed against the flat surfaces of cams 35 and 37 such that they can rotate freely while the compression also allows the two display segment structures to be rotated to a desired angle so that the angle can remained fixed in that position.

Figure 2:
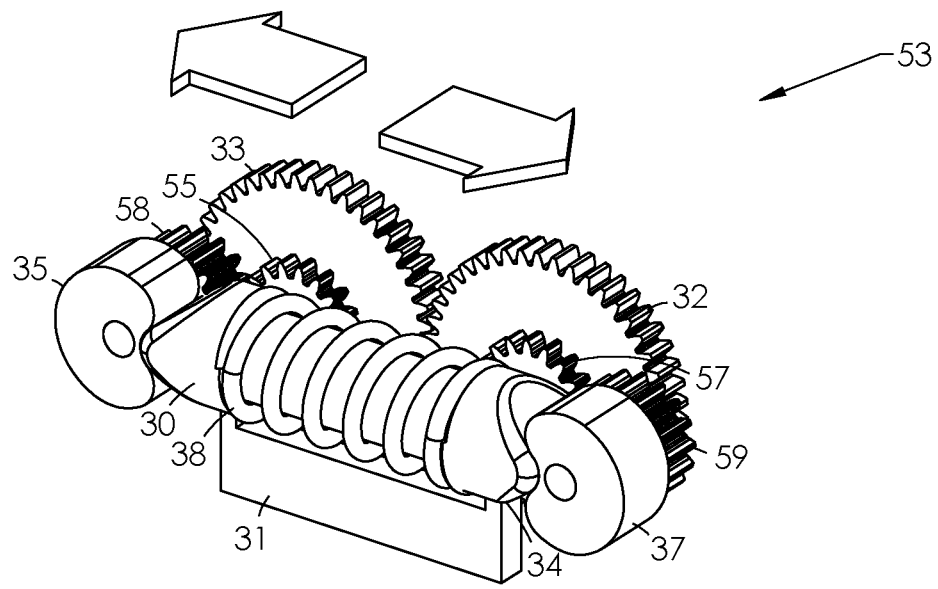
FIG. 2 is a perspective view showing the cam mechanism from FIG. 1 in a first position where the mechanism is in a locked state and then in a second position where the mechanism is in an unlocked state.
Figure 2:
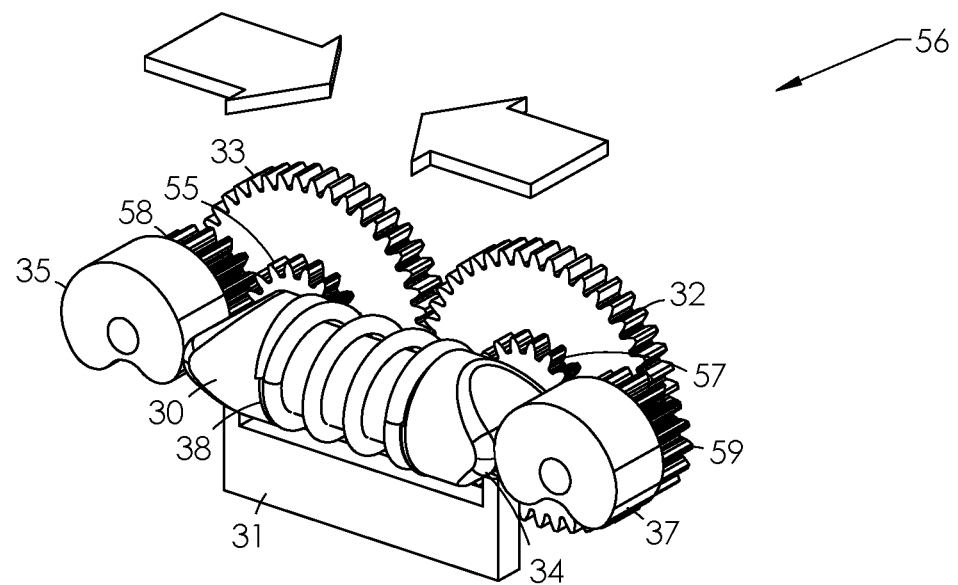
Figure 3:
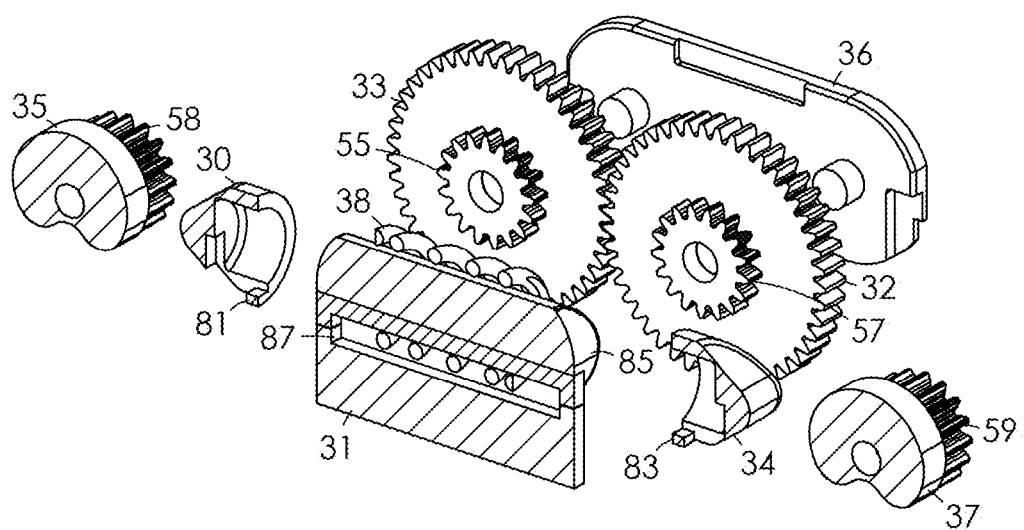
FIG. 3 is an exploded perspective view of the cam mechanism from FIG. 1 and FIG. 2 to highlight how the gearing and mechanical parts engage with each other.

In FIG. 3, an exploded perspective view of the same cam mechanism from FIG. 1 and FIG. 2 is shown to highlight how the gearing and mechanical parts engage with each other. The parts shown at the front of the assembly are also illustrated in section to reveal how a track is located at the center portion of pin holding structure 31. This track 85 and opening 87 allows compression spring 38 and pins 30 and 34 and their respective guide structures 81 and 83 to slide transversely such that they remain attached to pin holding structure 31, while the compression spring 38 and rotating cams 35 and 37 forces pins 30 and 34 to move inward and outward as the device is folded.

Figure 4:
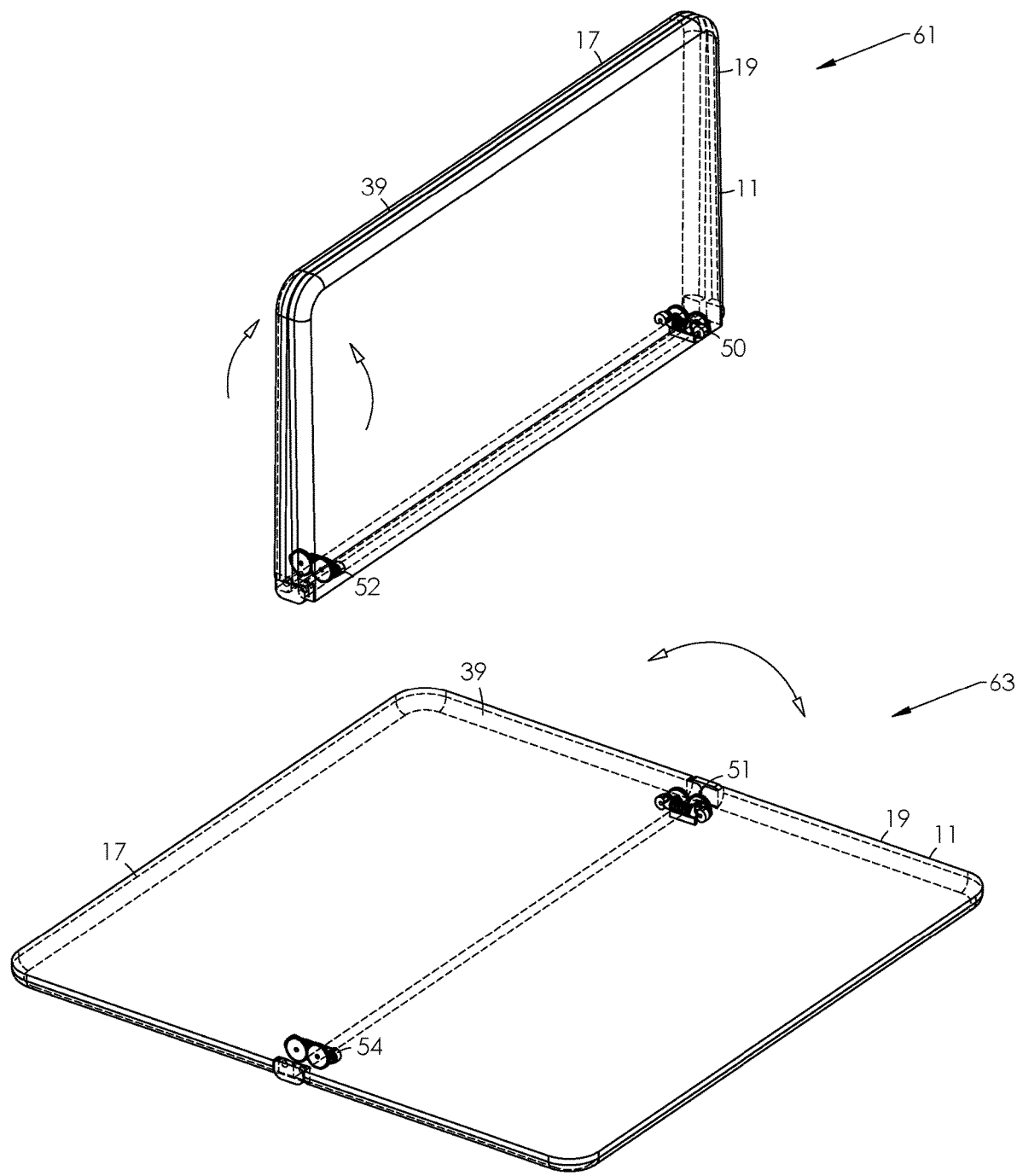
FIG. 4 is a perspective view of a foldable computing device highlighting the location of the cam mechanism from the previous figures shown in two separate positions, the first position shows the device in a folded unlocked state, and the second position shows the device in a unfolded locked state.

FIG. 4 is a perspective view of foldable computing device 11 highlighting the location of the cam mechanism within the device. There are also two positions shown in FIG. 4. The first position 61 shows foldable computing device 11 in a folded state where the cam mechanisms are shown in an unlocked configuration 50 and 52 on the two opposite sides of the central hinge structure, and then a second position 63 shows foldable computing device 11 in an unfolded state where the cam mechanisms are shown in a locked configuration 51 and 54. Flexible display 39 is also shown sitting above the cam mechanisms and includes display segments 17 and 19. It is also important to note that while the embodiments show a single flexible display with two display segments, a rigid cover display may also be included with the device, and two rigid tiled display segments may also be integrated instead of having a flexible display. The device may also have different display aspect ratios such that it takes on a flip phone form factor. Any reference to the term "pin" may also be interpreted as a "follower" component which is a term commonly used for cam assemblies.

While certain features of the invention have been illustrated and described herein, many modifications, substitutions, changes, and equivalents will now occur to those of ordinary skill in the art 1t is, therefore, to be understood that the appended claims are intended to cover all such modifications and changes that fall within the spirit of the invention.

What is claimed is:

1. An apparatus comprising:
   (a) a flexible touch-sensitive display composed of a first flexible touch-sensitive display portion and a second flexible touch-sensitive display portion; wherein:
      (1) the first flexible touch-sensitive display portion is attached to a first structural support segment;
      (2) the second flexible touch-sensitive display portion is attached to a second structural support segment;
      (3) the flexible touch-sensitive display further comprises having a fully folded state;
      (4) the flexible touch-sensitive display further comprises having a partially expanded state;
      (5) the flexible touch-sensitive display further comprises having a fully expanded state;
   (b) a mechanism having a cam with a continuous compressive force applied to the cam by a pin component and a compression spring, whereby the pin component has an internal cavity with an open end on a first end of the pin and a closed end on a second end of the pin which further includes a guide structure situated within the internal cavity of the pin, whereby the pin and the compression spring are supported by a pin holding structure having a track and opening which are configured in a transverse position spanning between the first and the second flexible touch-sensitive display structural support segments; whereby the guide structure of the pin and the compression spring move axially along the pin holding structure track and partially within the pin holding structure opening, and the cam is mechanically linked to at least one flexible touch-sensitive display structural support segment such that as the apparatus is folded, the folding motion of the apparatus activates the rotational motion of the cam mechanism.

2. The apparatus of claim 1 wherein:
the pin holding structure includes a slot such that the guide structure of the pin component can slide within the slot.

3. The apparatus of claim 1 wherein:
the first structural support segment and the second structural support segment are connected by a hinge and a sleeve structure that houses the hinge.

4. The apparatus of claim 3 wherein:
the cam is mechanically connected to at least one structural support segment; and the pin component and pin holding structure is mechanically connected to the hinge sleeve structure.

5. The apparatus of claim 3 wherein:
the cam is mechanically connected to a spur gear and the spur gear is mechanically connected to at least one structural support segment; and the pin component and pin holding structure is mechanically connected to the hinge sleeve structure.

6. The apparatus of claim 1 wherein:
the compression spring can simultaneously provide a force against a first pin component situated on a first side of the compression spring and a second pin component situated on a second side of the compression spring.

7. An apparatus comprising:
(a) a rigid touch-sensitive display;
(b) a flexible touch-sensitive display composed of a first flexible touch-sensitive display portion and a second flexible touch-sensitive display portion; wherein:
  (1) the first flexible touch-sensitive display portion is attached to a first structural support segment;
  (2) the second flexible touch-sensitive display portion is attached to a second structural support segment;
  (3) the flexible touch-sensitive display further comprises having a fully folded state;
  (4) the flexible touch-sensitive display further comprises having a partially expanded state;
  (5) the flexible touch-sensitive display further comprises having a fully expanded state;
(c) a mechanism having a cam with a continuous compressive force applied to the cam by a pin component and a compression spring, whereby the pin component has an internal cavity with an open end on a first end of the pin and a closed end on a second end of the pin which further includes a guide structure situated within the internal cavity of the pin, whereby the pin and the compression spring are supported by a pin holding structure having a track and opening which are configured in a transverse position spanning between the first and the second flexible touch-sensitive display structural support segments; whereby the guide structure of the pin and the compression spring move axially along the pin holding structure track and partially within the pin holding structure opening, and the cam is mechanically linked to at least one flexible touch-sensitive display structural support segment such that as the apparatus is folded, the folding motion of the apparatus activates the rotational motion of the cam mechanism.

8. The apparatus of claim 7 wherein:
the pin holding structure includes a slot such that a guide structure of the pin component can slide within the slot.

9. The apparatus of claim 7 wherein:
the first structural support segment and the second structural support segment are connected by a hinge and a sleeve structure that houses the hinge.

10. The apparatus of claim 9 wherein:
the cam is mechanically connected to at least one structural support segment; and the pin component and pin holding structure is mechanically connected to the hinge sleeve structure.

11. The apparatus of claim 9 wherein:
the cam is mechanically connected to a spur gear and the spur gear is mechanically connected to at least one structural support segment; and the pin component and pin holding structure is mechanically connected to the hinge sleeve structure.

12. The apparatus of claim 7 wherein:
the compression spring can simultaneously provide a force against a first pin component situated on a first side of the compression spring and a second pin component situated on a second side of the compression spring.

* * * * *